United States Patent [19]
Yoshikawa

[11] Patent Number: 4,529,142
[45] Date of Patent: Jul. 16, 1985

[54] BRAKE DEVICE FOR A SPINNING REEL
[75] Inventor: Osamu Yoshikawa, Sakai, Japan
[73] Assignee: Shimano Industrial Company Limited, Osaka, Japan
[21] Appl. No.: 495,412
[22] Filed: May 17, 1983
[30] Foreign Application Priority Data May 26, 1982 [JP] Japan .............................. 57-78223[U]

[51] Int. Cl.³ .............................................. A01K 89/01
[52] U.S. Cl. ........................... 242/84.5 A; 242/84.2 R
[58] Field of Search ................... 242/84.5 A, 84.21 R, 242/84.53, 84.51 A, 84.2 R, 84.5 R, 84.51 R

[56] References Cited
U.S. PATENT DOCUMENTS 2,918,227 12/1959 Mauborgne ................... 242/84.21 R
3,258,218 6/1966 Stadler ......................... 242/84.21 R
4,416,427 12/1983 Kawai ........................... 242/84.2 R Primary Examiner—Stuart S. Levy
Assistant Examiner—Katherine Jaekel
Attorney, Agent, or Firm—Stevens, Davis, Miller & Mosher

[57] ABSTRACT

A fishing reel comprising a rotary frame supported rotatably to a reel body so that the rotary frame is driven to rotate to thereby wind a fishing line onto a spool, wherein a braking member is supported freely rotatably for providing a resistance against reverse rotation of the rotary frame and is adapted to rotate together with the rotary frame through a unidirectional rotation transmitting mechanism when the rotary frame is driven to rotate.

5 Claims, 2 Drawing Figures

BRAKE DEVICE FOR A SPINNING REEL

FIELD OF THE INVENTION

This invention relates to a fishing reel, and more particularly to a fishing reel which rotatably supports at the front of a reel body a fishing line winding mechanism having a rotary frame and which is coupled to a handle which in turn is operated to drive the fishing line winding mechanism, thereby winding a fishing line onto a spool.

BACKGROUND OF THE INVENTION

Generally, the fishing reel constructed as described above is called a spinning reel, and is provided with an anti-reverse-rotation mechanism for preventing reverse rotation of the fishing line winding mechanism. An operating member is operated to put the reel in the anti-reverse-rotation mode when the fishing line is wound, and in the reverse-rotation-permitting mode when the line is drawn out.

In the case where the line, when wound in the anti-reverse-rotation mode, may be broken by tension caused by a pull of a hooked fish, the operating member is operated to put the rotary frame in the reverse-rotation-permitting mode so that the rotary frame is reversely rotated by a pull of a hooked fish to thereby draw out the line from the spool, at which time an angler contacts his finger with the rear of the rotary frame to adjust the extent of reverse rotation corresponding to variation in tension applied to the line. In this case, a problem is created in that the angler should be skillful to properly adjust the reverse rotation of the rotary frame.

In order to solve the above problem, a fishing reel has hitherto been proposed which is so constructed that a tubular shaft at the fishing line winding mechanism fixedly supports a ratchet wheel, a disc-shaped brake member is supported rotatably to the front of the reel body, a pawl engageable with the ratchet wheel is pivoted to the brake member and provided with a spring for elastically clipping the ratchet wheel at both sides of the outer peripheral portion thereof, and a brake lever having a brake shoe to contact with the brake member is pivoted to the reel body, so that when the rotary frame reversely rotates by a pull of a hooked fish, the pawl engages with the ratchet wheel to reversely rotate the brake member together with the rotary frame and the brake lever is operated to bring the shoe into contact with the brake member, thereby giving the rotary frame a predetermined resistance against its reverse rotation to thereby adjust the extent thereof.

In such a fishing reel of conventional construction, when the rotary frame is driven to rotate for winding the line, the ratchet wheel, and in turn the tubular shaft, is subjected to clipping pressure through the clipping spring, thereby applying a larger rotational resistance to the tubular shaft, and in turn to the rotary frame, resulting in a heavy operation of the handle, that is, more force is required to rotate the handle. Also, the pawl, during the rotation of the driven rotary frame, disengages from the ratchet wheel to make it impossible to confirm from the exterior whether or not the braking action is exerted.

SUMMARY OF THE INVENTION

An object of the invention is to provide a fishing reel which can reduce a rotational resistance applied to the rotary frame when the fishing line winding mechanism including the rotary frame is driven to rotate, and in which an angler can confirm from the reel exterior whether or not the braking effect is exerted on the rotation of rotary frame at the fishing line winding mechanism during the rotation thereof.

In this invention a fishing reel which includes a reel body, a fishing reel winding mechanism having a rotary frame and supported rotatably to the reel body, a spool shaft having a spool and supported to the reel body in relation of being movable in reciprocation longitudinally thereof, a drive mechanism for driving the fishing line winding mechanism, and a reciprocation mechanism for moving the spool shaft in reciprocation in association with the drive mechanism, is provided with a brake mechanism which applies a resistance against the rotation of fishing line winding mechanism and comprises the following described components. The brake mechanism is provided with a brake member freely rotatable with respect to the drive mechanism and a brake lever supported to the reel body and having a shoe to contact with the brake member. In addition, between the brake member and a rotary member positioned in proximity to the brake member and including the rotary frame is provided a unidirectional rotation transmitting mechanism comprising a pawl, ratchet teeth engageable therewith, and a spring for biasing the pawl toward the ratchet teeth so that during the driven-rotation of the rotary frame the brake member is adapted to rotate together with the rotary member.

Accordingly, since the brake member, when the drive mechanism drives the fishing line winding mechanism, rotates together with the drive mechanism, a rotational resistance to the drive mechanism, and in turn to the fishing line winding mechanism, considerably reduced to enable the handle to be turned with a light touch.

Moreover, the brake lever, when the fishing line winding mechanism is driven, is operated to exert the braking effect to the rotation of the brake member, whereby the fishing line winding mechanism can be given a resistance caused by the elastic engagement of the pawl by the spring with the ratchet teeth at the unidirectional rotation transmitting mechanism. Hence, the inertial rotation of the fishing line winding mechanism, especially of the rotary frame, can be restricted, and the pawl repeats engagement and disengagement with and from the ratchet teeth so as to generate clicking sounds, whereby the angler can easily confirm from the reel exterior by the clicking sounds whether or not the brake member is exerting the braking action during the driven-rotation of the fishing line winding mechanism.

These and other objects of the invention will become more apparent upon a reading of the following detailed specification and drawings, in which:

DETAILED DESCRIPTION OF THE INVENTION

Figure 1:
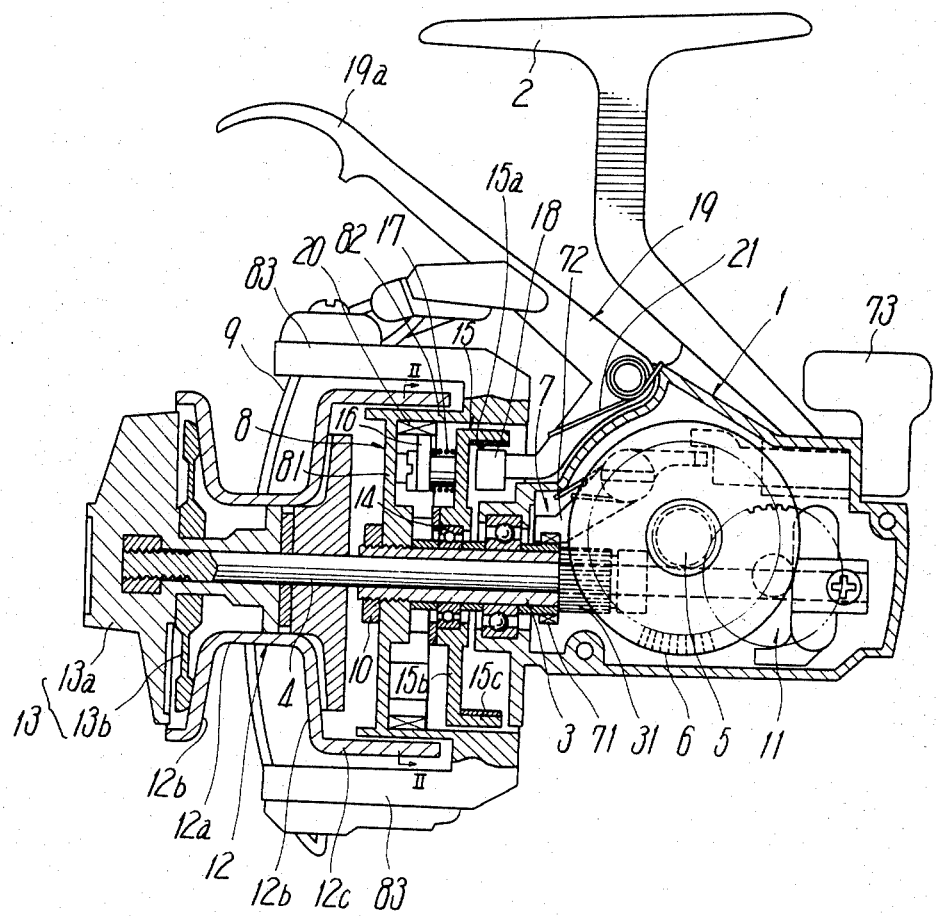
FIG. 1 is a longitudinal sectional view of an embodiment of a fishing reel of the invention.

Referring to FIG. 1, reference numeral 1 designates a hollow reel body having at the upper surface a mounting leg 2 for a fishing rod and at the front a through bore, 3 designates a tubular shaft supported in the through bore through bearings, and 4 designates a spool shaft supported to the reel body 1 in relation of being movable longitudinally thereof through the tubular shaft 3. The reel body 1 is provided at one side wall with a shaft bore perforating therethrough perpendicularly to the axis of tubular shaft 3, the shaft bore rotatably supporting therein a handle shaft 5 for a handle (not shown). At the projection of handle shaft 5 into the reel body 1 is provided a master gear 6 engageable with a pinion 31 to be discussed below. In addition, the master gear 6 is disc-like-shaped and has at one side surface of the outer peripheral portion of the gear body a number of teeth disposed circumferentially thereof and engageable with the pinion 31.

The tubular shaft 3 projects at one axial end into the reel body 1 and at the other axial end to the exterior and the inward projection is provided at the outer periphery of the utmost end with the pinion 31 engageable with the master gear 6 and an anti-reverse-rotation gear 71 at an anti-reverse-rotation mechanism 7. The outward projection fixes at the outer periphery of the utmost end through a lock nut a rotary frame 8 comprising a disc 81 having a through bore fitted onto the tubular shaft 3, a cylindrical portion 82 extending axially from the outer peripheral portion of disc 81, and a pair of arms 83 extending axially outwardly from the cylindrical portion 82 and supporting a bail arm 9 in a manner permitting it to be turned over between a fishing line winding position and a fishing line releasing position.

The spool shaft 4 passes through the tubular shaft 3, enters at one axial end into the reel body 1, and projects at the other axial end outwardly thereof. Between the inward projection and the master gear 6 is provided a reciprocation mechanism for the spool shaft 4, and at the outer periphery of the other axial end is mounted a spool 12 detachably through a control member 13a at a drag mechanism 13, the spool 12 comprising a trunk 12a on which the line is wound, a pair of flanges 12b extending radially outwardly from both axial ends of trunk 12a, and a cylindrical skirt 12c extending axially outwardly from one flange 12b. In addition, the drag mechanism 13 comprises the control member 13a and a disc-like contact 13b so that the control member 13a is tightened to give a large resistance against rotation of spool 12 with respect to the spool shaft 4 and loosened to reduce the resistance.

The anti-reverse-rotation mechanism 7 comprises the anti-reverse-rotation gear 71 provided at the tubular shaft 3, an anti-reverse-rotation pawl 72 engageable with the gear 71, and an operating member 73 for the pawl 72, the pawl 72 and operating member 73 being supported to the reel body 1 so that the operating member 73 can be turned to swing the pawl 72 which is switched between a position where the pawl 72 engages with the gear 71 and one where the same disengages therefrom.

In the above well-known construction, the tubular shaft 3, rotary frame 8 and bail arm 9, constitute the fishing line winding mechanism, and the handle, handle shaft 5, master gear 6, and pinion 31, constitute a drive mechanism for driving the fishing line winding mechanism.

Figure 2:
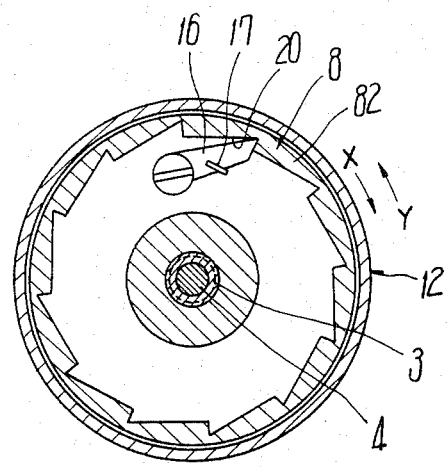
FIG. 2 is a sectional view taken on the line II—II in FIG. 1.

The fishing reel of the invention constructed as above-mentioned is provided with a brake mechanism shown in FIGS. 1 and 2, which provides a resistance against the rotation of fishing line winding mechanism.

A typical embodiment of the brake mechanism applied to the fishing reel of the invention is shown in FIG. 1. A brake member 15 having an annular brake face 15a is supported freely rotatably, at an intermediate portion of tubular shaft 3, between the reel body 1 and the rotary frame 8, a pawl 16 is pivoted swingably to the brake member 15, a spring 17 biasing the pawl 16 toward the ratchet teeth 20 to be discussed below is interposed between the pawl 16 and the brake member 15, a brake lever 19 having a shoe 18 to contact with the brake face 15a at the brake member 15 is supported swingably at the upper portion of reel body 1, and a number of ratchet teeth are provided at the inner periphery of cylinder 81 at the rotary frame 8 and disposed at regular intervals circumferentially of cylinder 81, the pawl 16 biased by the spring 17 and engaging with the ratchet teeth 20 so as to constitute a unidirectional rotation transmitting mechanism, whereby when the rotary frame 8 is driven to rotate in the direction of the arrow X in FIG. 2, the brake member 15 rotates together with the rotary frame 8 through the engagement resistance of pawl 16 to the ratchet teeth 20, and when the contact resistance of shoe 18 to the brake member 15 overcomes the engagement resistance between the pawl 16 and the ratchet teeth 20, the brake member 15 is restrained from its rotation together with the rotary frame 8. On the other hand, during the reverse rotation of rotary frame 8 in the direction of the arrow Y in FIG. 2, the the brake member 15 is rotated forcibly through the above engagement, in which the contact resistance of shoe 18 to the brake member 15 is adjusted to regulate the extent of reverse rotation of rotary frame 8.

The brake member 15 comprises a disc 15b having a through bore through which the tubular shaft 3 is inserted and a cylinder 15c extending axially outwardly from the outer peripheral portion of disc 15b, the cylinder 15c providing at the inner periphery thereof the brake face 15a, and the disc 15b pivotably supporting the pawl 16. In addition, the brake member 15 is preferably mounted on the tubular shaft 3 rotatably through the bearing 14 as shown, but may be mounted directly on the same.

The brake lever 19 is about L-like-shaped, has at one end the shoe 18 and at the other end a control portion 19a, and is pivoted at an intermediate bent portion to the reel body 1. Between the lever 19 and the reel body 1 is interposed a spring 21 for biasing the shoe 18 away from the brake face 15a, so that the lever 19 is operated against the spring force of spring 21 to bring the shoe 18 into contact with the brake face 15a. In addition, the control portion 19a is disposed in the vicinity of a free end of mounting leg 2.

Next, an explanation will be provided on the operation of the fishing reel constructed as abovementioned.

At first, for casting, the bail arm 9 is turned to the fishing line release position, and for fishing a hooked fish, the bail arm 9 is turned over to the fishing line wind position and then the handle (not shown) is rotated. In other words, the rotational force of handle is transmitted to the rotary frame 8 through the handle shaft 5, master gear 6, pinion 31 and tubular shaft 3, so that the rotary frame 8 is driven to rotate in the direction of the arrow X in FIG. 2, and the bail arm 9 guides the line to the trunk 12a of spool 12, thereby winding it thereon. At this time, the spool shaft 4 is subjected to the rotational force through the reciprocating mechanism 11 and moves in reciprocation longitudinally of the reel body 1 to thereby wind up the line uniformly on the trunk 12a. When there is no fear of the line being broken by its tension during winding of the line, the handle is operated to rotate the rotary frame 8 in the anti-reverse-rotation mode, that is, the anti-reverse-rotation pawl 72, as shown in FIG. 1, engages with the anti-reverse-rotation gear 71 at the anti-reverse-rotation mechanism 7 to restrain the reverse rotation of rotary frame 8, at which time the rotational force of rotary frame 8 is transmitted to the brake member 15 through the engagement resistance to the pawl 16 in engagement with the ratchet teeth 20, thereby rotating the brake member 15 together with the rotary frame 8. In this case, the brake member 15 freely rotatable through the bearing 14 can reduce the rotational resistance to the rotary frame 8 when driven to rotate. Also, the brake lever 19 is operated to bring the shoe 18 into contact with the brake face 15a at the brake member 15 to give thereto a resistance against the rotation together with the rotary frame 8, thereby restricting the inertial rotation of rotary frame 8 when driven to rotate. The brake member 15 when rotating together with the rotary frame 8, is given a larger resistance than the rotational resistance, thereby restraining the rotation of brake member 15 together with the rotary frame 8, at which time the pawl 16 at the brake member 15 which is not rotating rides over one ratchet tooth 20 and then is hit by the next one to generate clicking sounds intermittently at short intervals, whereby the angler can confirm from the exterior whether or not the rotary frame 8 when driven to rotate is subjected to the braking effect.

In a case where there is a fear of the line being broken by tension applied thereto during winding of the line, the control member 73 at the anti-reverse-rotation mechanism 7 is operated to change over the anti-reverse-rotation pawl 72 to the non-engaging position with respect to the anti-reverse-rotation gear 71, thereby putting the rotary frame 8 in the reverse-rotation permitting mode. When the tension applied to the line increases to rotate the rotary frame 8 reversely in the direction of the arrow Y in FIG. 2, the reverse rotation of rotary frame 8 is given to the brake member 15 through the ratchet teeth 20 and pawl 16 to thereby forcibly rotate the brake member 15, at which time the brake lever 19 is operated to bring the shoe 18 into contact with the brake face 15a at the brake member 15, thereby enabling adjustment of the extent of reverse rotation of rotary member 8 and also of an amount of the line drawn out from the spool 12.

Alternatively, the brake member 15 may be supported to, for example, the master gear 6 or handle shaft 5 and the ratchet teeth 20 may be provided at the outer periphery of master gear 6. In brief, the brake member 15 need only be supported in the drive system including the handle through the rotary frame 8, and the rotary frame 8 be provided at the rotary member including the rotary frame 8 within the drive system.

Also, the pawl 16 may alternatively be pivoted to the rotary member and a ratchet wheel be provided at the brake member.

As seen from the above, the fishing reel of the invention enables even an unskilled angler to facilitate adjustment of reverse rotation of the fishing reel winding mechanism only by operating the brake lever and operate the handle in a light touch because the rotational resistance against the rotary frame during its rotation is considerably reduced. Furthermore, the inertial rotation of the rotary frame when driven to rotate can be easily restricted by operating the brake lever and an angler can confirm from the reel exterior whether or not the braking effect is exerted on the rotary frame when driven to rotate.

While an embodiment of the invention has been shown and described, the invention is not limited to the specific construction thereof, which is merely exemplary of the invention rather than being restrictive.

What is claimed is:

1. A fishing reel comprising a reel body, a fishing line winding mechanism having a rotary frame and supported rotatably to said reel body, a spool shaft having a spool and supported to said reel body so that said spool shaft is movable in reciprocation longitudinally of said reel body, a drive mechanism for driving said fishing line winding mechanism, a reciprocation mechanism for moving said spool shaft in reciprocation in association with said drive mechanism, and a brake mechanism for providing a resistance against rotation of said fishing line winding mechanism, said brake mechanism being provided with a brake member supported by a bearing so as to be freely rotatable with respect to said drive mechanism in opposite rotation directions, a brake lever supported to said reel body and having a shoe for contacting with said brake member, a rotary member in proximity to said brake member and integral with said rotary frame, and a unidirectional rotation transmitting mechanism provided between said brake member and said rotary member, said unidirectional rotation transmitting mechanism comprising a pawl, ratchet teeth engageable therewith, and a spring biasing said pawl toward said ratchet teeth, so that when said rotary frame is driven to rotate in a first direction the engagement resistance of said pawl with said ratchet teeth causes said brake member to rotate together with said rotary member until said brake shoe applies a resistance to said brake member sufficient to overcome said engagement resistance and when said rotary frame is reversely rotated said brake member is forceably rotated by the positive engagement of said pawl with said ratchet teeth whereby the contact of said shoe with said brake member regulates the reverse rotation of said rotary frame.

2. A fishing reel according to claim 1, wherein said fishing line winding mechanism is provided with said rotary frame and a tubular shaft fixedly supporting said rotary frame, said tubular shaft being supported to said reel body, said brake member being supported freely rotatably to said tubular shaft.

3. A fishing reel according to claim 2, wherein said rotary frame is provided with a cylindrical portion having an inner periphery on which said ratchet teeth are located so that said pawl engageable with said ratchet teeth is pivoted swingably to engage said brake member.

4. A fishing reel according to claim 1, wherein said brake member comprises a disc and a cylindrical portion extending axially from the outer periphery of said disc, said cylindrical portion forming at an inner periphery thereof a brake face.

5. A fishing reel according to claim 4, wherein said brake lever having the shoe opposite to the brake face of said brake member has a substantially L-like-shape and is pivoted at an intermediate portion to said reel body, said shoe being disposed inwardly of said cylindrical portion at said brake member so that said brake lever can be operated in swinging motion to bring said shoe into contact with said brake face.

* * * * *